(12) United States Patent
Cao et al.

(10) Patent No.: US 12,498,199 B2
(45) Date of Patent: Dec. 16, 2025

(54) RETICLE ADJUSTING STRUCTURE, MULTI-MODE SIGHTING DEVICE, AND RETICLE ADJUSTING METHOD THEREOF

(71) Applicant: RAYTRON TECHNOLOGY CO., LTD., Yantai (CN)

(72) Inventors: Jinqiu Cao, Hefei (CN); Feng Hu, Hefei (CN); Jinchao Tu, Hefei (CN)

(73) Assignee: RAYTRON TECHNOLOGY CO., LTD., Yantai (CN)

( * ) Notice: Subject to any disclaimer, the term of this patent is extended or adjusted under 35 U.S.C. 154(b) by 0 days.

(21) Appl. No.: 18/752,820

(22) Filed: Jun. 25, 2024

(65) Prior Publication Data

US 2024/0344806 A1 Oct. 17, 2024

Related U.S. Application Data

(63) Continuation of application No. PCT/CN2022/094493, filed on May 23, 2022.

(30) Foreign Application Priority Data

Jan. 17, 2022 (CN) .......................... 202210050633.8

(51) Int. Cl.
*F41G 1/473* (2006.01)
*F41G 1/14* (2006.01)
(Continued)

(52) U.S. Cl.
CPC ................. *F41G 1/16* (2013.01); *F41G 1/14* (2013.01); *F41G 1/36* (2013.01); *F41G 1/38* (2013.01);
(Continued)

(58) Field of Classification Search
None
See application file for complete search history.

(56) References Cited

U.S. PATENT DOCUMENTS

| 5,497,266 A | 3/1996 | Owen |
| 6,691,447 B1 * | 2/2004 | Otteman .................. F41G 1/38 |
| | | 42/129 |

(Continued)

FOREIGN PATENT DOCUMENTS

| CN | 101614506 A | 12/2009 |
| CN | 106973272 A | 7/2017 |

(Continued)

OTHER PUBLICATIONS

International Search Report of PCT Patent Application No. PCT/CN2022/094493 issued on Oct. 10, 2022.
(Continued)

*Primary Examiner* — Derek S. Chapel
(74) *Attorney, Agent, or Firm* — Andrew C. Cheng

(57) ABSTRACT

A reticle adjusting structure includes a reticle plate, a beam combination lens, and a relay lens assembly arranged in sequence along a visible-light optical axis, and a display module arranged outside of the visible-light optical axis. The beam combination lens includes a first light entry surface and a second light entry surface that are arranged opposite to each other and respectively face a visible light signal incidence direction and the display module. A visible light signal of a target field of view passes through the reticle plate to get incident on the first light entry surface of the beam combination lens, and is then transmitted to the relay lens assembly. The reticle plate, the beam combination lens, the relay lens assembly and the display module are interconnected together to form an integrated lens set that is collectively movable together, in order to realize collective adjustment during a reticle adjusting course.

20 Claims, 7 Drawing Sheets

(51) Int. Cl.
*F41G 1/16* (2006.01)
*F41G 1/36* (2006.01)
*F41G 1/38* (2006.01)
*G02B 23/04* (2006.01)
*G02B 23/10* (2006.01)
*G02B 27/36* (2006.01)

(52) U.S. Cl.
CPC ............ *F41G 1/473* (2013.01); *G02B 23/04* (2013.01); *G02B 23/105* (2013.01); *G02B 27/36* (2013.01)

(56) References Cited

U.S. PATENT DOCUMENTS

| | | | | |
|---|---|---|---|---|
| 8,867,129 | B2* | 10/2014 | Tesmar | .................... G02B 7/04 359/425 |
| 2008/0302966 | A1 | 12/2008 | Reed | |
| 2009/0223107 | A1* | 9/2009 | Lin | ........................ G02B 23/04 42/115 |

FOREIGN PATENT DOCUMENTS

| | | |
|---|---|---|
| CN | 208588275 U | 3/2019 |
| CN | 113203320 A | 8/2021 |
| CN | 113267090 A | 8/2021 |
| CN | 214010110 U | 8/2021 |
| CN | 215296000 U | 12/2021 |
| CN | 114296229 A | 4/2022 |
| TW | M619604 U | 11/2021 |
| WO | 2020071864 A1 | 4/2020 |

OTHER PUBLICATIONS

The first office action of CN patent application No. 202210050633.8 issued on Jun. 29, 2023.
The search report of CN patent application No. 202210050633.8 issued on Jun. 29, 2023.
The second office action of CN patent application No. 202210050633.8 issued on Jan. 12, 2024.

* cited by examiner low magnification | high magnification (directly adjusting reticle) | high magnification (adjusting integrated lens set)

RETICLE ADJUSTING STRUCTURE, MULTI-MODE SIGHTING DEVICE, AND RETICLE ADJUSTING METHOD THEREOF

TECHNICAL FIELD

The present invention relates to the technical field of image processing, and more particularly to a reticle adjusting structure, a multi-mode sighting device, and a reticle adjusting method thereof.

BACKGROUND

Mainstream sighting devices that are currently available in the market are often single-light-path white-light or low-light sights, of which viewing is constrained and does not work under certain extremely severe conditions, such as thick smoke and thick fog. On the other hand, an infrared sight may overcome such deficiency and the infrared sight works in both daytime and nighttime. However, the infrared sight does not enable viewing of detailed features of a prey and does not identify what animal the prey is.

For a professional hunter, hunting may last for a relatively long period of time and hunting scenario does not just occur in the daytime, and there may be need for hunting in the nighttime. Thus, for a hunter who needs to use white-light sight in the daytime for clearer details, while using an infrared sight in the nighttime for searching and aiming at a prey, there are only two options, one being carrying two sights and one hunting rifle. There will be an issue of repeated rifle calibration if two sights and one rifle are carried. This arrangement makes it necessary to remove one of the sights from the rifle when it needs to swap the sights and then remounting the other sight. Rifle calibration has to be performed for each time of the removal and remounting. Frequent removal and remounting is generally very tedious. Further, there is generally no place in the wild for operation of rifle calibration. Also, there will be waste of ammunition for multiple times of rifle calibration. The second option is to carry two sights and two hunting rifles, of which one hunting rifle is mounted with a white-light sight, while the other hunting rifle is mounted with an infrared sight. Rifles can be calibrated before starting off, so that the rifles can be operated directly at hunting. However, the burden of the user is increased if a single person has to carry two hunting rifles at the same time, and also the cost of purchasing rifles is increased.

For the sight users, they are more concerned about fast and accurately capture and aim at a target in various different environments, and this allows the multi-spectrum imaging technology to be used in thermographic sighting devices.

SUMMARY OF THE INVENTION

To overcome the technical problems of the known technology, embodiments of the present invention provide a reticle adjusting structure, a multi-mode sighting device, and a reticle adjusting method thereof.

In one aspect, the present application provides a reticle adjusting structure which comprises a reticle plate, a beam combination lens, and a relay lens assembly arranged in sequence along a visible-light optical axis and a display module arranged outside of the visible-light optical axis, wherein the beam combination lens comprises a first light entry surface and a second light entry surface that are opposite to each other and respectively face a visible light signal incidence direction and the display module. A visible light signal of a target field of view passes through the reticle plate to get incident on the first light entry surface of the beam combination lens, and is then transmitted to the relay lens assembly; a message displayed on the display module transmits, in the form of an optical signal, onto the second light entry surface of the beam combination lens, and is then reflected to the relay lens assembly. The reticle plate, the beam combination lens, the relay lens assembly, and the display module are interconnected together to form an integrated lens set that is collectively movable together, in order to realize collective adjustment during a reticle adjusting course.

In a second aspect, the present application provides a multi-mode sighting device which comprises a white-light aiming assembly and an infrared module. The white-light aiming assembly comprises the reticle adjusting structure according to any embodiment of the present application. The visible light signal of the target field of view gets incident on the first light entry surface of the beam combination lens and is transmitted to the relay lens assembly to finally form a white-light image; the infrared module collects an infrared image to transmit to the display module for displaying, so that the infrared image transmits, in the form of an optical signal, to get incident on the second light entry surface of the beam combination lens, and is then reflected to the relay lens assembly.

In a third aspect, the present application provides a multi-mode sighting device which comprises a white-light aiming assembly and a laser range-finding module. The white-light aiming assembly comprises the reticle adjusting structure according to any embodiment of the present application. The laser range-finding module is operable to measure, through a laser optical path, a distance of a search target in a target field of view to generate and transmit a distance message associated with the distance to the display module for displaying, so that the distance message transmits, in the form of an optical signal, to get incident on the second light entry surface of the beam combination lens, and is then reflected to the relay lens assembly.

In a fourth aspect, the present application provides a reticle adjusting method, applying the reticle adjusting structure according to any embodiment of the present application. The method comprises the following steps:

controlling the integrated lens set to move together according to a magnification rate adjustment operation to adjust a magnification rate, so as to make the reticle positioned in a central region of a current field of view;

according to a visual positional difference of a current image display region of the display module under the current magnification rate and a white-light image correspondingly formed of a visible light signal, acquiring a position calibration operation for adjusting movement of the image display region of the display module in horizontal and/or vertical directions; and controlling a displacement amount of the image display region in the horizontal and/or vertical directions with image pixel being taken as unit according to the position calibration operation, in order to eliminate the positional difference.

In a fifth aspect, the present application provides a multi-mode sighting device which comprises a white-light aiming assembly, an infrared module, a laser range-finding module, and a display module that is respectively connected with the infrared module and the laser range-finding module.

The white-light aiming assembly comprises a beam combination lens, and the beam combination lens comprises a first light entry surface and a second light entry surface that are opposite to each other and respectively face a visible light signal incidence direction and the display module, wherein a visible light signal of a target field of view moves along a white-light optical path to get incident on the first light entry surface of the beam combination lens, and is then transmitted to a rear end of the white-light optical path to form a white-light image of a search target.

The infrared module is operable to collect, through an infrared optical path, an infrared image of the search target to transmit to the display module for displaying, so that the infrared image transmits, in the form of an optical signal, to get incident on the second light entry surface of the beam combination lens, and is then reflected to the rear end of the white-light optical path.

The laser range-finding module is operable to measure, through the laser optical path, a distance of the search target to generate and transmit a distance message associated with the distance to the display module for displaying, so that the distance message transmits, in the form of an optical signal, to get incident on the second light entry surface of the beam combination lens, and is then reflected to the rear end of the white-light optical path.

The multi-mode sighting device comprises at least one operation mode of a white aiming mode, a laser white aiming mode, an infrared aiming mode, a white-light/infrared combination mode, and a multiple beam combination mode; the white aiming mode is realized with only the white-light aiming assembly in operation; the laser white aiming mode is realized with only the white-light aiming assembly and the laser range-finding module in operation; the infrared aiming mode is realized with only the infrared module in operation; the white-light/infrared combination mode is realized only with the white-light aiming assembly and the infrared module in operation; and the multiple beam combination mode is realized with the white-light aiming assembly, the infrared module, and the laser range-finding module in operation together.

In the reticle adjusting structure, the multi-mode sighting device, and the reticle adjusting method provided in the above embodiments, the reticle plate, the beam combination lens, the relay lens assembly, and the display module are interconnected together to form an integrated lens set that is collectively movable together, and as such, in an application scenario in which an image displayed by the display module and an image formed through the integrated lens set are combined, when a magnification rate of the image formed through the integrated lens set, the display module is moved in combination with the reticle plate, the beam combination lens is being adjusted, and the relay lens assembly, so that the reticle is constantly kept at a central region of the current field of view, avoiding the problem that the reticle deviates from the central field of view during the magnification variation course, making the reticle adjusting structure capable of supporting various application scenarios of visualization of the image formed through the integrated lens set alone, visualization of the image displayed by the display module alone, and visualization of a combination of the images of the two.

In the above, in the multi-mode sighting device that is formed of a combination of the white-light aiming assembly with the infrared module and the laser range-finding module provided in the above embodiments, each individual one of the white-light aiming assembly, the infrared module and the laser range-finding module keeps relatively integral functionality and independence of its own. The white-light aiming assembly may fulfill a white aiming mode; the infrared module may fulfill an infrared aiming mode; and the laser range-finding module may fulfill a laser distance measurement function. By means of the arrangement of a beam combination lens and the arrangement of relative positions of the beam combination lens and a display module, an infrared optical path and a laser optical path are additionally included as being independent of a white-light optical path, so that it is possible to realize a white-light/infrared combination mode that combines a white-light image of the white-light aiming mode and an infrared image of the infrared aiming mode, a laser white aiming mode that activates the laser distance measurement function of the laser range-finding module in the white-light aiming mode, and a multiple beam combination mode that activates the laser distance measurement function of the laser range-finding module in the white-light/infrared combination mode. As such, by means of the integrated arrangement, it only needs for one time operation of rifle calibration to provide a user with options of various operation modes based on the requirements of various application scenarios to thereby suit the need for whole-day use and to overcome the deficiency of functionality insufficiency of sights of a single type. Even in case of running out of electrical power, where the functions of the infrared module and the laser range-finding module are limited, the function of the white-light aiming assembly is not affected and can independently use the white aiming mode to further expand the scope of application for the multi-mode sighting device.

DETAILED DESCRIPTION OF THE PREFERRED EMBODIMENTS

Figure 1:
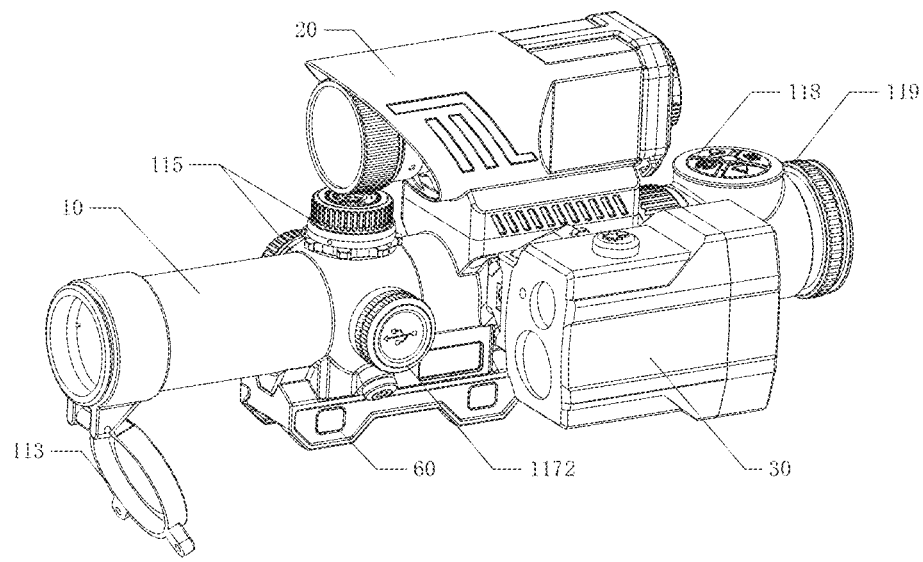
FIG. 1 is a perspective view showing a multi-mode sighting device according to one embodiment.
Figure 2:
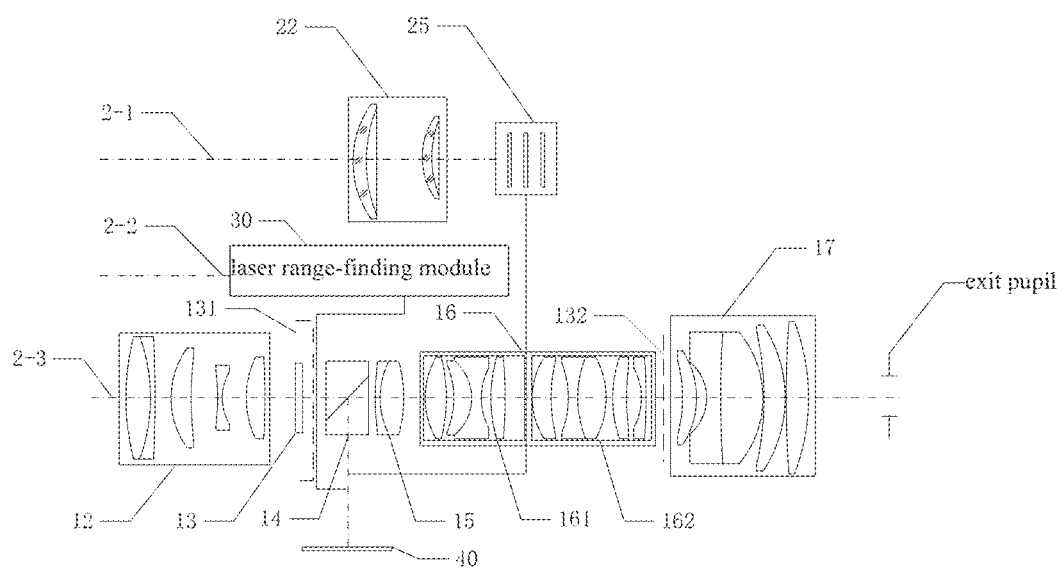
FIG. 2 is a schematic view showing the principle of light path for a multi-mode sighting device according to one embodiment.

Technical solutions of the present invention will be better expounded in detail with reference to the attached drawings and embodiments of the disclosure.

Unless otherwise defined, all the technical and scientific terms used in the disclosure are of the same meanings as those understood by the technical artisans of the technical field to which the present invention belongs. The terms used in the disclosure of the present invention are used only for the purpose of describing the embodiments and are not intended to limit the scope of protection that the present invention pursues. The term "and/or" as used herein includes any and all combinations of one or multiple items included in a listing.

In the following description, expressions related to "some embodiments" describe subsets of all potentially possible embodiments, but it is understood that "some embodiments" may refer to identical subsets or different subsets of all possible embodiments and can be combined with each other provided they are not in confliction with each other.

Referring to FIGS. 1-8, a reticle adjusting structure according to an embodiment of the present application comprises a reticle plate 13, a beam combination lens 14, and a relay lens assembly 16 sequentially arranged along a visible-light optical axis, and a display module 40 outside of the visible-light optical axis. The beam combination lens 14 comprises a first light entry surface and a second light entry surface that are opposite to each other and respectively face a visible light signal incidence direction and the display module 40. A visible light signal of a target field of view passing through the reticle plate 13 is incident on the first light entry surface of the beam combination lens 14, and is then transmitted to the relay lens assembly 16. A message displayed on the display module 40 transmits, in the form of an optical signal, to be incident on the second light entry surface of the beam combination lens 14, and is then reflected to the relay lens assembly 16. The reticle plate 13, the beam combination lens 14, the relay lens assembly 16, and the display module 40 are interconnected together to form an integrated lens set that is collectively movable together, in order to realize collective adjustment during a reticle adjusting course.

In the above embodiment, the reticle plate 13, the beam combination lens 14, the relay lens assembly 16, and the display module 40 are interconnected together to form the collectively-movable integrated lens set, and in an application scenario of combination for an image displayed by the display module 40 and an image formed through the integrated lens set, when a magnification rate of the image formed through the integrated lens set is being adjusted, the display module 40 is moved along with the reticle plate 13, the beam combination lens 14, and the relay lens assembly 16, so that the reticle is constantly kept at a central area of the current field of view, avoiding the problem that the reticle deviates from the central field of view during the magnification variation course, making the reticle adjusting structure capable of supporting various application scenarios of visualization of image formed through the integrated lens set alone, visualization of the image displayed by the display module 40 alone, and visualization of a combination of the images of the two.

Optionally, the reticle adjusting structure further comprises a white-light objective lens set 12 and an eyepiece set 17. The white-light objective lens set 12, the reticle plate 13, the beam combination lens 14, the relay lens assembly 16, and the eyepiece set 17 are sequentially arranged along the visible-light optical axis. The visible light signal of the target field of view first transmits into the white-light objective lens set 12, and is focused by the white-light objective lens set 12 to form a first formed image on an image plane of the reticle plate 13. An optical signal of the first formed image gets incident on the first light entry surface of the beam combination lens 14, and the visible light signal transmitting through the beam combination lens 14 transmits through the relay lens assembly 16 to form a second formed image on an image plane of the eyepiece set 17. The image displayed on the display module 40 transmits, in the form of an optical signal to get incident on the second light entry surface of the beam combination lens 14, and is reflected by the second light entry surface toward the relay lens assembly 16 to combine with the second formed image.

In this arrangement, the white-light objective lens set 12, the reticle plate 13, the beam combination lens 14, the relay lens assembly 16, and the eyepiece set 17 that are sequentially arranged along the visible-light optical axis are main components of the white-light aiming assembly 10. The image formed by the integrated lens set is a white-light image which is formed from a visible light signal by the white-light aiming assembly 10. The image displayed on the display module 40 can be an infrared image formed by the infrared module 20, and correspondingly, a sight including the reticle adjusting structure provided in the embodiment of the application can be a multi-mode sighting device that is a combination of the white-light aiming assembly 10 and the infrared module 20. The image displayed on the display module 40 can also be a display interface image that displays a distance message with respect to a search target measured by the laser range-finding module 30, and correspondingly, a sight including the reticle adjusting structure provided in the embodiment of the application can be a multi-mode sighting device that is a combination of the white-light aiming assembly 10 and the laser range-finding module 30. The image displayed on the display module 40 can further be an infrared image including a distance message measured by the laser range-finding module 30, and correspondingly, a sight including the reticle adjusting structure provided in the embodiment of the application can be a multi-mode sighting device formed as a combination of the white-light aiming assembly 10 and the infrared module 20, the laser range-finding module 30.

For an overall understanding of the multi-mode sighting device, on the other hand, the embodiment of the application provides a multi-mode sighting device which comprises the white-light aiming assembly 10, the infrared module 20, the laser range-finding module 30, and the display module 40 that is respectively connected with the infrared module 20 and the laser range-finding module 30. The white-light aiming assembly 10 comprises the reticle adjusting structure. The infrared module 20 is configured to acquire an infrared image of a detected target through an infrared optical path and transmit the infrared image to the display module 40 to be displayed thereby, so that the infrared image transmits, in the form of an optical signal, to get incident onto the second light entry surface of the beam combination lens 14, and is then reflected to the relay lens assembly 16. The laser range-finding module 30 is configured to acquire a distance message of the detected target measured along a laser optical path for transmission to the display module 40 to be displayed thereby, so that the distance message transmits, in the form of an optical signal, to get incident onto the second light entry surface of the beam combination lens 14, and is then reflected to the relay lens assembly 16. During a course of operation of the multi-mode sighting device, a white aiming mode is realized with only the white-light aiming assembly 10 in operation, and a laser white aiming mode is realized with only the white-light aiming assembly 10 and the laser range-finding module 30 in operation, and an infrared aiming mode is realized with only the infrared module 20 in operation, and a white-light/infrared combination mode is realized with only the white-light aiming assembly 10 and the infrared module 20 in operation, and a multiple beam combination mode is realized with the white-light aiming assembly 10, the infrared module 20, and the laser range-finding module 30 in operation together.

The white-light aiming assembly 10 comprises a main barrel 11. The white-light objective lens set 12, the reticle plate 13, the beam combination lens 14, the relay lens assembly 16, and the eyepiece set 17 are all arranged in an interior of the main barrel 11 sequentially along the visible-light optical axis, wherein the reticle plate 13 is arranged between the white-light objective lens set 12 and the beam combination lens 14. The reticle plate 13 and the eyepiece set 17 respectively define a first image plane 131 and a second image plane 132 during an image forming process performed by the white-light aiming assembly 10. During a course of operation of the white-light aiming assembly 10, a visible light signal of the target field of view first transmits into the white-light objective lens set 12 and is focused by the white-light objective lens set 12 on the first image plane 131 of the reticle plate 13 to form the first formed image which is an inverted image, and the light beam passes through the reticle plate 13 to transmit into the beam combination lens 14, where the first light entry surface of the beam combination lens 14 is coated with a semi-transmissive and semi-reflective film for visible light. The visible light signal that passes through the reticle plate 13 and enters the beam combination lens 14, is transmitted through the first light entry surface to enter a field lens, where the field lens is capable of contracting the diameter of the beam so as to help reduce the size of the relay lens assembly 16 and thus reducing the overall size of the multi-mode sighting device and lowering the overall weight. The relay lens assembly 16 is made up of a magnification variation lens set and a compensation lens set, wherein the magnification variation lens set is movable in a direction of the visible-light optical axis to vary a magnification rate of the white-light aiming assembly 10, and the compensation lens set is movable along the optical axis to make the image formed by the relay lens assembly 16 clear. After passing through the relay lens assembly 16, the visible light signal forms a second formed image on the second image plane 132 of the eyepiece set 17, where the second formed image is an upright image. Human eyes may observe the second formed image through the eyepiece set 17, so as to clearly observe the target. The infrared module 20 comprises an infrared objective lens set 22 that is configured to collect infrared signals in the target field of view and an infrared core 25 that is configured to transform the infrared signal into an electrical signal. The display module 40 is configured to receive the electrical signal transmitted from the infrared core 25 and displays an infrared image corresponding thereto. The infrared image displayed by the display module 40 transmits, in the form of an optical signal, to the second light entry surface of the beam combination lens 14 and is reflected by the beam combination lens 14 to transmit into the eyepiece set 17. The laser range-finding module 30 comprises a transmitting terminal, a receiving terminal, and a distance counting circuit. The transmitting terminal is configured to transmit a pulse laser beam toward a search target in a target field of view. The receiving terminal is configured to receive the pulse laser beam reflected from the search target. The distance counting circuit is configured to determine a distance with respect to the search target according to transmitting time, receiving time, and transmission speed of the pulse laser beam, generate and transmit a distance message associated with distance to the display module 40 for displaying.

In the above, the white aiming mode of the multi-mode sighting device refers to a mode where both the laser range-finding module 30 and the infrared module 20 are not in operation, and only the white-light aiming assembly 10 is in operation for observing and aiming at a target.

The laser white aiming mode refers to a mode where the infrared module 20 is not in operation and a distance message measured by the laser range-finding module 30 can be displayed on the display module 40 to allow human eyes to not only see a white-light search target through the eyepiece set 17 of the white-light aiming assembly 10, but also read a distance of the search target on the display module 40.

The infrared aiming mode refers to a mode where both the white-light aiming assembly 10 and the laser range-finding module 30 are not in operation and an infrared image outputted from the infrared module 20 is displayed on the display module 40 to allow human eyes to see an infrared search target through the eyepiece set 17.

The white-light/infrared combination mode refers to a mode where the laser range-finding module 30 is not in operation, and an infrared image outputted from the infrared module 20 transmits, in the form of an optical signal, to get incident onto the second light entry surface of the beam combination lens 14 to combine with a visible light signal transmitting through the beam combination lens 14 on the image plane of the eyepiece set 17, wherein the infrared image shows high brightness for a high thermal energy region to allow a user to better identify and aim the target.

The multiple beam combination mode refers to a mode where the white-light aiming assembly 10, the infrared module 20, and the laser range-finding module 30 are all in operation, and an infrared image outputted from the infrared module 20 transmits, in the form of an optical signal, to get incident onto the second light entry surface of the beam combination lens 14 to combine with a visible light signal transmitting through the beam combination lens 14 on the image plane of the eyepiece set 17, wherein the infrared image shows high brightness for a high thermal energy region, and a distance message measured by the laser range-finding module 30 is displayed on the display module 40, so that human eyes not only see a white-light/infrared combined image through the eyepiece set 17, but also read a distance of a search target on the display module 40.

In the multi-mode sighting device, the integrated arrangement of the white-light aiming assembly 10, the infrared module 20, and the laser range-finding module 30 keeps relatively integral functionality and independence of each individual one of the white-light aiming assembly 10, the infrared module 20, and the laser range-finding module 30. During the course of operation of the infrared module 20, the infrared signal of the target field of view transmits through the infrared objective lens set 22 and is then collected by an infrared sensor of the infrared core 25, and is converted through processing with a series of image algorithm by the infrared core 25 into a clear infrared image that is outputted to the display module 40 to display thereon, and this forms an infrared optical path 2-1. During the course of operation of the laser range-finding module 30, when the laser range-finding module 30 receives a "distance request signal", the transmitting terminal transmits a pulse laser beam which is contracted by the transmitting optics system and is then transmitted to the search target, meanwhile the receiving terminal uses a principal wave sampling circuit to sample a principal wave, which after being shaped, is transmitted to a counter of the distance counting circuit to activate the distance counter; and the pulse laser beam reflected from the search target is converged by the receiving optics system of the receiving terminal onto an accurate position finder (APD), and the APD outputs a return wave signal which is subjected to amplification and signal processing to transmit to the counter of the distance counting circuit to deactivate the distance counter. Upon finishing counting operation, the counter may determine the transmitting time, the receiving time, and the transmission speed of the pulse laser beam according to the activation and deactivation times, compute the distance message with respect to the search target, and transmit the distance message to a system superior device, thereby obtaining a result of distance measurement. The distance message is then displayed, through a flat cable, on the display module 40. The laser transmitting optical path, the laser receiving optical path, and the distance counting circuit computing and transmitting the distance message to display on the display module 40 form a laser optical path 2-2. During the course of operation of the white-light aiming assembly 10, the white-light objective lens set 12, the beam combination lens 14, the relay lens assembly 16, and the eyepiece set 17 form a white-light optical path 2-3, and the visible light signal of the target field of view is focused by the white-light objective lens set 12 and transmits through the beam combination lens 14 and the relay lens assembly 16 to form a white-light image on the image plane of the eyepiece set 17 to allow human eyes to observe the white-light image through the eyepiece set 17.

In the multi-mode sighting device provided in the above embodiment, the white-light aiming assembly 10, the infrared module 20 and the laser range-finding module 30 are combined together, and each individual one of the white-light aiming assembly 10, the infrared module 20 and the laser range-finding module 30 keeps relatively integral functionality and independence of its own. The white-light aiming assembly 10 may fulfill the white aiming mode; the infrared module 20 may fulfill the infrared aiming mode; and the laser range-finding module 30 may fulfill the laser distance measurement function. By means of the arrangement of the beam combination lens 14 and the arrangement of relative positions of the beam combination lens 14 and the display module 40, the infrared optical path 2-1 and the laser optical path 2-2 are additionally included as being independent of the white-light optical path 2-3, so that it is possible to realize the white-light/infrared combination mode that combines a white-light image of the white-light aiming mode and an infrared image of the infrared aiming mode, the laser white aiming mode that activates the laser distance measurement function of the laser range-finding module 30 in the white-light aiming mode, and the multiple beam combination mode that activates the laser distance measurement function of the laser range-finding module 30 in the white-light/infrared combination mode. As such, by means of the integrated arrangement, it only needs for one time operation of rifle calibration to provide the user with options of various operation modes based on the requirements of various application scenarios to thereby suit the need for whole-day use and to overcome the deficiency of functionality insufficiency of sights of one single type. Even in case of running out of electrical power, where the functions of the infrared module and the laser range-finding module are limited, the function of the white-light aiming assembly is not affected and can independently use the white aiming mode to further expand the scope of application for the multi-mode sighting device.

Figure 3:
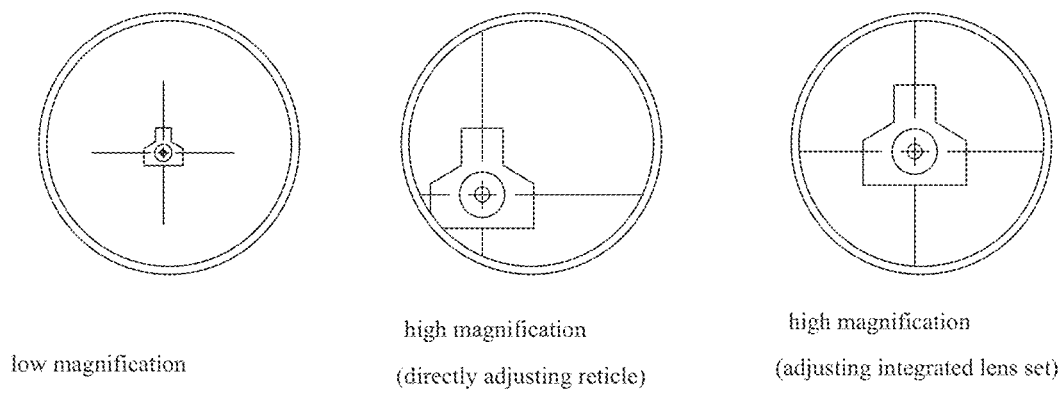
FIG. 3 is a diagram of comparison showing reticle positions in a magnification adjustment course of one embodiment.
Figure 4:
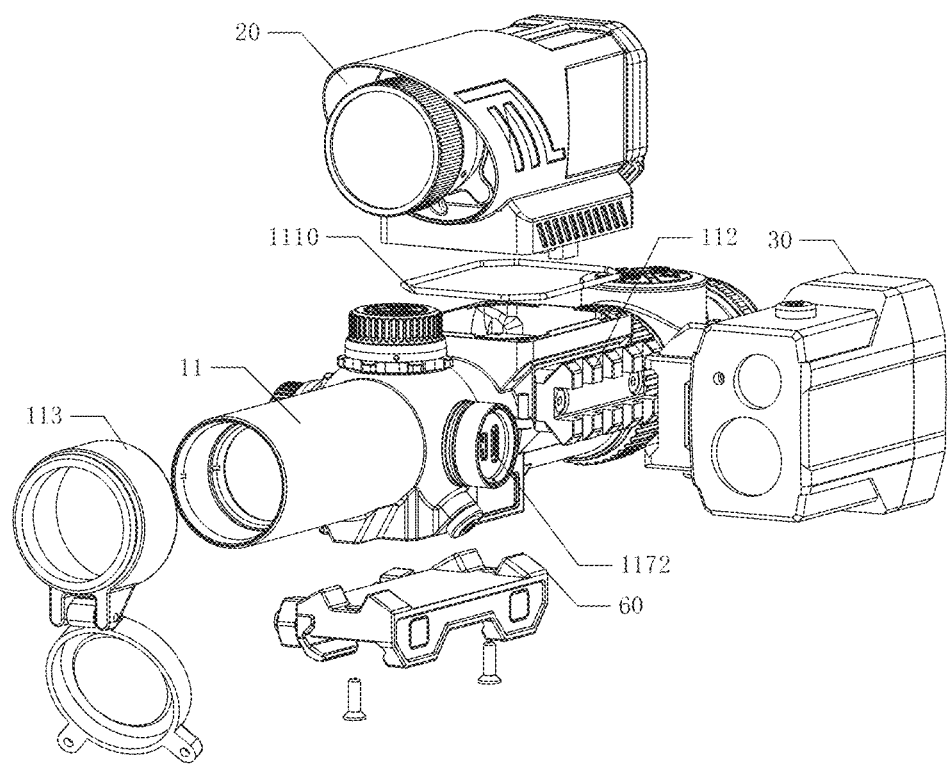
FIG. 4 is an exploded view showing a multi-mode sighting device according to one embodiment.
Figure 5:
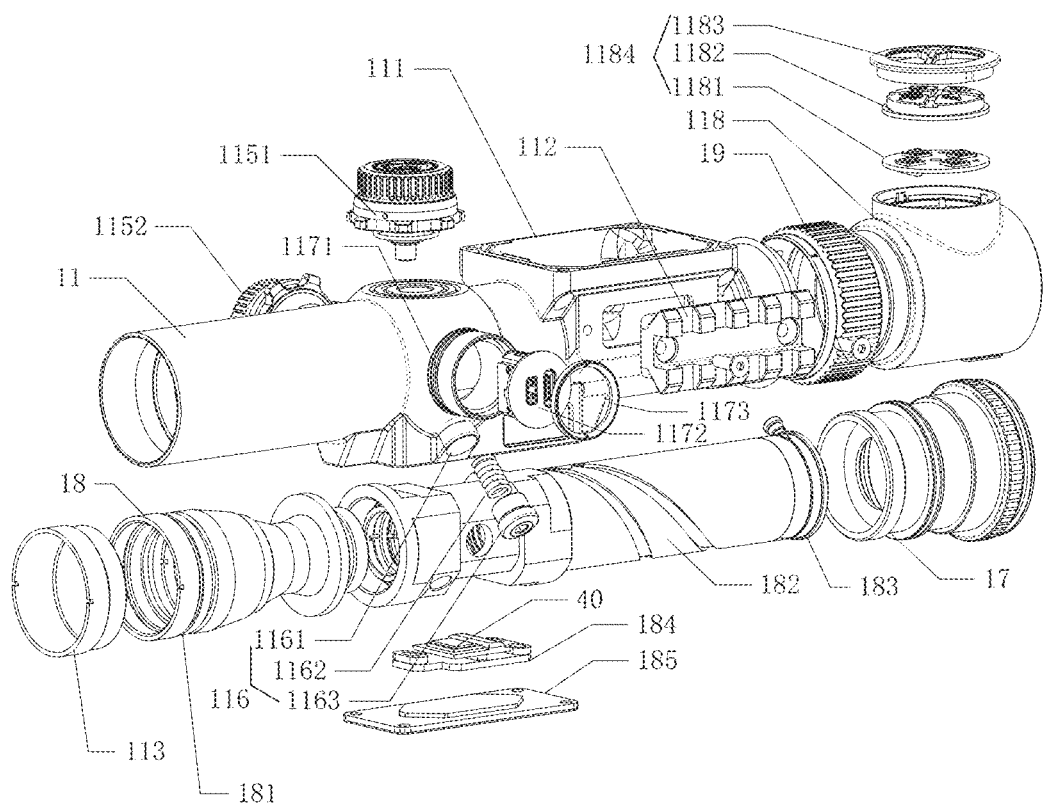
FIG. 5 is an exploded view showing a white-light aiming assembly according to one embodiment.
Figure 6:
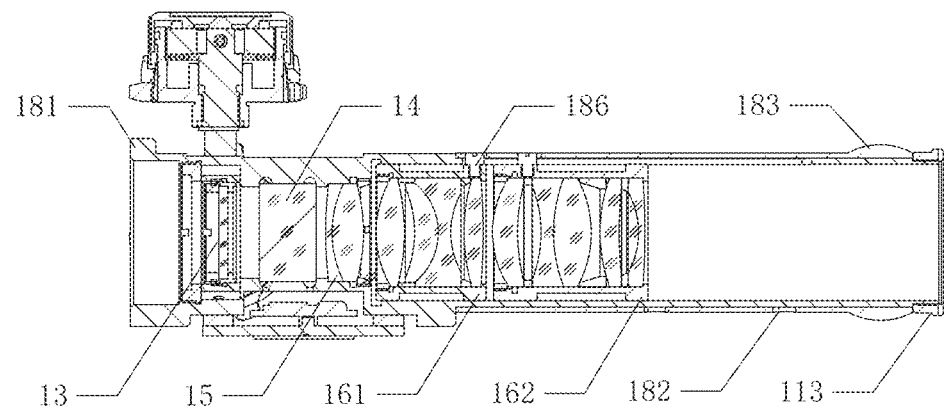
FIG. 6 is a transverse cross-sectional view showing an integrated lens set and a reticle adjusting assembly thereof according to one embodiment.
Figure 7:
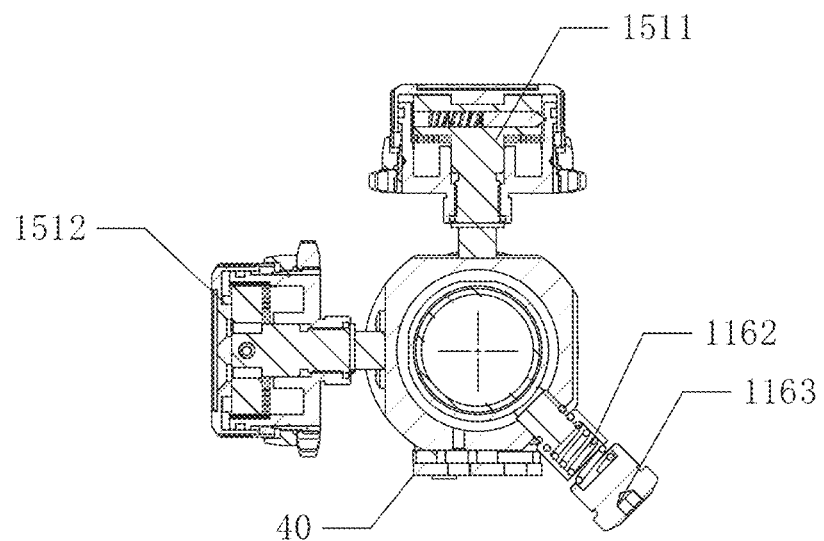
FIG. 7 is a longitudinal cross-sectional view showing an integrated lens set and a reticle adjusting assembly thereof according to one embodiment.
Figure 8:
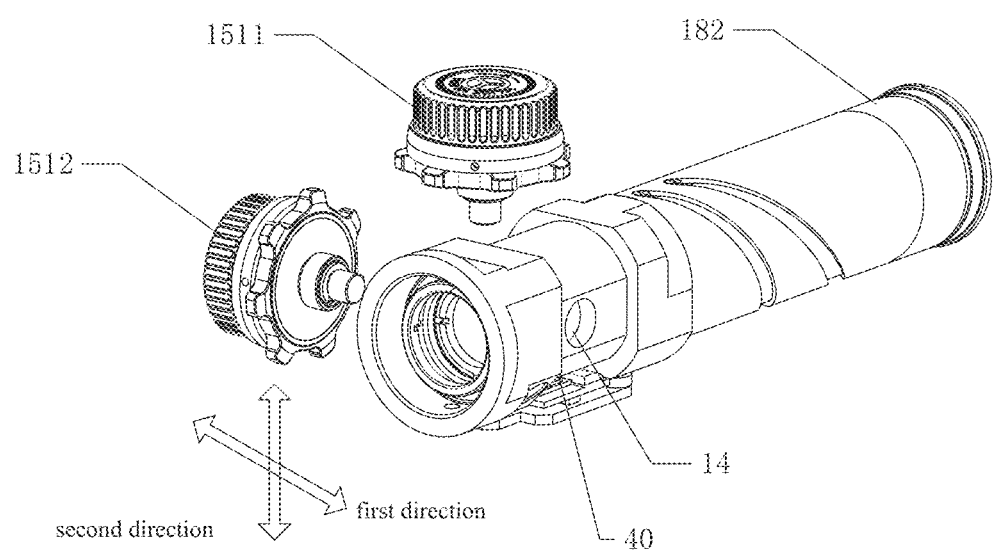
FIG. 8 is an exploded view showing an integrated lens set and a reticle adjusting assembly thereof according to one embodiment.

Optionally, the relay lens assembly 16 comprises a magnification variation lens set 161. The magnification variation lens set 161 is movable along the visible-light optical axis to adjust the magnification rate. Following the adjustment of the magnification rate fulfilled with the magnification variation lens set 161, during variation of the magnification, the reticle may expand or contract with the variation of the magnification rate. When the multi-mode sighting device is operated in the infrared aiming mode, it is possible to avoid observing a mechanical reticle present in an infrared image to affect observation of the target in the infrared image. The reticle plate 13, the beam combination lens 14, the relay lens assembly 16, and the display module 40 jointly form an integrated lens set that is movable together, enabling whole-set adjustment by having the reticle plate 13, the beam combination lens 14, and the relay lens assembly 16 carrying the display module 40 to move together, as shown in FIG. 3, and this resolves the problem that the mechanical reticle deviates from the center of the field of view during the course of adjustment from low magnification to high magnification and prevents the angle of the magnification variation lens set 161 relative to the display module 40 from inclining and changing, leading to image being unclear or being impossible to observe a complete displayed area resulting from change of the position of the image plane. In adjusting the reticle, the entirety of the magnification variation lens set 161 is also adjusted, so that the reticle is constantly held at a central region of the current field of view for either high magnification or low magnification, wherein the central region refers to a designated regional area that is close to the center position of the current field of view.

Optionally, the relay lens assembly 16 comprises a compensation lens set 162. The compensation lens set 162 is movable along the visible-light optical axis to adjust image clearness. The relay lens assembly 16 comprises the magnification variation lens set 161 and the compensation lens set 162, and the compensation lens set 162 is located at the side that is adjacent to the eyepiece set 17. Optionally, the white-light aiming assembly 10 further comprises a field lens 15 arranged between the beam combination lens 14 and the relay lens assembly 16. The field lens 15 functions to contract the diameter of a light beam transmitting from the beam combination lens 14 toward the relay lens assembly 16. In an optional illustrative example, the white-light optical path 2-3 comprises the white-light objective lens set 12, the reticle plate 13, the beam combination lens 14, the field lens 15, the relay lens assembly 16, and the eyepiece set 17 arranged in sequence in the direction of the visible-light optical axis. A parallel light beam from the target field of view is focused by the white-light objective lens set 12 to form, for the first time, a first formed image on the first image plane 131 where the reticle plate 13 is located, and the first formed image is an inverted image. The light beam passes through the reticle plate 13 to transmit into the beam combination lens 14, and the first light entry surface of the beam combination lens 14 is coated with a semi-transmissive and semi-reflective film for visible light. The visible light signal passing through the reticle plate 13 and transmitting into the beam combination lens 14 is transmitted through the first light entry surface to transmit into the field lens 15, and the field lens 15 contracts the diameter of the beam so as to help reduce the size of the relay lens assembly 16 and thus reducing the overall size of the multi-mode sighting device and lowering the overall weight. The relay lens assembly 16 is made up of the magnification variation lens set 161 and the compensation lens set 162, wherein the magnification variation lens set 161 is movable in a direction of the visible-light optical axis to vary a magnification rate of the white-light aiming assembly 10, and the compensation lens set 162 is movable along the optical axis to make the image formed by the relay lens assembly 16 clear. After passing through the relay lens assembly 16, the visible light signal forms a second formed image on the second image plane 132 of the eyepiece set 17, where the second formed image is an upright image, and human eyes may observe the second formed image through the eyepiece set 17, so as to clearly observe the target. When the functions of the white-light aiming assembly 10 and the infrared module 20 are activated at the same time, an infrared image displayed on the display module 40 transmits, in the form of an optical signal, onto the second light entry surface of the beam combination lens 14, where the second light entry surface of the beam combination lens 14 is coated with a semi-transmissive and semi-reflective film for visible light, and the optical signal of the infrared image, when transmitting through the beam combination lens 14, is reflected on the second light entry surface to get into the field lens 15. A distance from the display module 40 to a center of the beam combination lens 14 is equal to a distance from the reticle plate 13 to the center of the beam combination lens 14, so that human eyes may simultaneously observe, through the eyepiece set 17, a displayed region of the display module 40 and the white-light image, achieving optical combination.

In some embodiments, the beam combination lens 14 is formed of a first prism and a second prism. Longitudinal cross-sectional surfaces of the first prism and the second prism are each a right-angled trapezoid. Slope surfaces of the first prism and the second prism are contacted on each other. The slope surface of the first prism serves as the first light entry surface of the beam combination lens 14, and the slope surface of the second prism serves as the second light entry surface of the beam combination lens 14. In a specific illustrative example, an outer contour of the beam combination lens 14, as a whole, is of a rectangular shape, and the first light entry surface and the second light entry surface are obliquely arranged between upper and lower surfaces of the beam combination lens 14. By varying the slope angle of the first light entry surface and the second light entry surface, the ratio of transmitting light or reflected light for light incident onto a corresponding one of the light entry surfaces can be changed. In some other optional embodiments, the beam combination lens 14 may be formed of a plane mirror, and an inclination angle is set between the plane mirror and the visible-light optical axis, such as 45 degrees. A slope surface of the plane mirror facing the incidence direction of the visible light signal acts as the first light entry surface, and the slope surface of the plane mirror that is opposite to the incidence direction of the visible light signal acts as the second light entry surface, wherein forming the beam combination lens 14 with a plane mirror can, on the one hand, help reduce space necessary for installation of the beam combination lens 14 to help reduce the overall size of the multi-mode sighting device, and can also, on the other hand, enable change of the inclination angle of the plane mirror to vary the ratio of transmitting light or reflected light for light incident onto a corresponding one of the light entry surfaces.

Optionally, referring to FIGS. 4-8, the white-light aiming assembly 10 comprises a cam barrel 18 received in the interior of the main barrel 11, and the reticle plate 13, the beam combination lens 14, and the relay lens assembly 16 are mounted inside the cam barrel 18, while the display module 40 is fixed on an outside of the cam barrel 18, and the cam barrel 18 drives the reticle plate 13, the beam combination lens 14, the relay lens assembly 16, and the display module 40 to realize the collective adjustment. The white-light aiming assembly 10 further comprises an adaptor board 184 that fixes the display module 40 on the outside of the cam barrel 18. The adaptor board 184 is provided with a mounting site for insertion and fixation of the display module 40. The adaptor board 184 can be fixed by means of screws to one side of the cam barrel 1 (for example, the lower side as shown in the drawing). One side of the adaptor board 184 that is opposite to the display module 40 is provided with a display screen cover plate 185, which provides an effect of assisting positioning in mounting the display module 40. By setting up the cam barrel 18 as a mounting carrier for the reticle plate 13, the beam combination lens 14, the relay lens assembly 16, and the display module 40, the cam barrel 18 functions as a core constituent part of the white-light aiming assembly 10. By rotating the cam barrel 18 and the rotation of the cam barrel 18 being transformed into linear movement of the magnification variation lens set 161 and the compensation lens set 162 in the direction of the visible-light optical axis, adjustment of the magnification rate is achieved.

In an optional example, the cam barrel 18 comprises a first barrel body 181 and a second barrel body 182. The beam combination lens 14 is fixed, by means of dispensing adhesive, in an interior of the first barrel body 181. The reticle plate 13 and the field lens 15 are respectively fixed, by means of press rings, in the interior of the first barrel body 181. A lubrication substance is spread between the relay lens assembly 16 and an inside surface of the first barrel body 181. The second barrel body 182 is sleeved on one end of the first barrel body 181 in which the relay lens assembly 16 is arranged. An outside surface of the second barrel body 182 is formed with a cam portion 183 that protrudes outside of the main barrel 11. The second barrel body 182 is formed with a positioning groove and a cam portion protruding outside of the main barrel 11. The relay lens assembly 16 is formed with a threaded hole, and the threaded hole aligns with the positioning groove. A fastening member 186 sequentially penetrates through the positioning groove and the threaded hole to fix to the relay lens assembly 16. When the second barrel body 182 is rotated by operating the cam portion 183, the relay lens assembly 16, as being constrained by the fastening member 186, is caused to move in the interior of the first barrel body 181 in the direction of the visible-light optical axis, so that the fastening member 186 transforms the rotation of the second barrel body 182 into driving the relay lens assembly 16 to move, frontwards and rearwards, inside the first barrel body 181 in the direction of the visible-light optical axis. Optionally, the threaded hole includes a first threaded hole and a second threaded hole that are respectively formed in outer circumferential surfaces of the magnification variation lens set 161 and the compensation lens set 162, and the second barrel body 182 is formed with a first positioning groove and a second positioning groove respectively aligned with the first threaded hole and the second threaded hole. In this, the white-light aiming assembly 10, the infrared module 20, and the laser range-finding module 30 each possess a modularized arrangement, allowing each module to be assembled or disassembled independently so as to reduce the difficulty of assembly for the multi-mode sighting device and improve assembly efficiency. For assembly of the white-light aiming assembly 10, firstly, the beam combination lens 14, the field lens 15, and the reticle plate 13 are sequentially mounted into the interior of the first barrel body 181, where the beam combination lens 14 is fixed by means of dispensing adhesive, and interfacing surfaces of the magnification variation lens set 161 and the compensation lens set 162 are spread with lubricant and then the magnification variation lens set 161 and the compensation lens set 162 are sequentially mounted into the interior of the first barrel body 181, the magnification variation lens set 161 and the compensation lens set 162 are caused to slide to have the lubricant uniformly spread between the interfacing surfaces of the magnification variation lens set 161 and the compensation lens set 162 and the inside surface of the first barrel body 181. Afterwards, the second barrel body 182 is mounted, in a manner of being rotatable relative to the first barrel body 181, on the one end of the first barrel body 181 within which the relay lens assembly 16 is arranged, and a tail end of the second barrel body 182 that is distant from the first barrel body 181 is provided with a stopper ring 113 for fixation, where the stopper ring 113 constrains movement of the second barrel body 182 in an axial direction of the main barrel 11. By rotating the cam portion 183 to have the positioning hole of the second barrel body 182 aligning with the threaded hole of the relay lens assembly 16 and then having the fastening member 186 penetrating through the positioning hole to fix to the relay lens assembly 16, initial assembly of the integrated lens set and the cam barrel 18 is completed; and then, the cam barrel 18, of which the initial assembly has been completed, is inserted into the main barrel 11 in a direction from the white-light objective lens set 12. Under this condition, rotating the cam portion 183 causes the second barrel body 182 to rotate, and under the effect of constraining by the fastening member 186, the magnification variation lens set 161 and the compensation lens set 162 are moved in the axial direction of the first barrel body 181 to achieve adjustment of the magnification rate.

In some embodiments, the main barrel 11 is provided with a reticle adjusting assembly 115. The reticle adjusting assembly 115 comprises a first adjusting member 1151 that is configured to adjust movement of the cam barrel 18 in the interior of the main barrel 11 in a first direction, a second adjusting member 1152 that is configured to adjust movement of the cam barrel 18 in the interior of the main barrel 11 in a second direction, and a pre-tightening assembly 116 that is configured to hold the cam barrel 18 at a designated position. The pre-tightening assembly 116 comprises a directing hole 1161 formed in the main barrel 11, an elastic member 1162 disposed in the directing hole 1161, and a threaded cap 1163 that encloses the elastic member 1162 in the interior of the directing hole 1161. The pre-tightening assembly 116 provides a pre-tightening force toward the cam barrel 18 by means of the elastic member 1162. The first adjusting member 1151 and the second adjusting member 1152 respectively controls movements of the integrated lens set in the first direction and the second direction. For example, the first direction and the second direction are perpendicular to each other, and the first direction and the second direction are respectively an up-down direction and a left-right direction on a plane that is perpendicular to the visible-light optical axis. After the integrated lens set is adjusted to move in the first direction and/or the second direction for a predetermined distance, a pre-tightening force is applied by the pre-tightening assembly 116 to the cam barrel 18 to hold the integrated lens set at an after-adjustment positional status.

Optionally, a spherical structure is provided on an end of the cam barrel 18, and an outside diameter of the spherical structure matches an inside diameter of the main barrel 11. The spherical structure functions to limit the integrated lens set to rotation about a center defined by the sphere under adjustment of the first adjusting member 1151 and the second adjusting member 1152. The first adjusting member 1151 and the second adjusting member 1152 exhibit 90 degrees therebetween in a circumferential direction of the main barrel 11. During the movement of the integrated lens set as being adjusted by means of either one of the first adjusting member 1151 and the second adjusting member 1152, the pre-tightening assembly 116 provides a position-restoring force, which is opposite to the movement direction, to the main barrel 11. In an illustrative example, the pre-tightening assembly 116 and the first adjusting member 1151 exhibit 135 degrees therebetween in the circumferential direction of the main barrel 11, and the pre-tightening assembly 116 and the second adjusting member 1152 exhibit 135 degrees therebetween in the circumferential direction of the main barrel 11. The directions of adjustment of the first adjusting member 1151 and the second adjusting member 1152 applied on the integrated lens set are perpendicular to each other, and the direction in which the pre-tightening force applied by the pre-tightening assembly 116 is set at 45 degrees with respect to each of the directions of adjustment of the first adjusting member 1151 and the second adjusting member 1152. When reticle adjustment is performed with the first adjusting member 1151 and/or the second adjusting member 1152, the integrated lens set is caused to do rotary motion about a center defined by the sphere. The first adjusting member 1151 and the second adjusting member 1152 each comprise a rotary knob portion and a guide rod projecting outwards from one side of the rotary knob portion. The first adjusting member 1151 and the second adjusting member 1152 abut a surface of the first barrel body 181 through the guide rod. Taking the first direction being an X-direction and the second direction being a Y-direction perpendicular to the X-direction as an example, when the rotary knob portion of the first adjusting member 1151 is twisted and rotated, the guide rod of the first adjusting member 1151 drives the integrated lens set to move in the extension direction of the guide rod of the first adjusting member 1151 along the X-direction, and when the rotary knob portion of the first adjusting member 1151 is twisted and rotated in a reversed direction, under the action of the elastic member 1162, the elastic member 1162 pushes the integrated lens set to move in a direction opposite to the previous movement direction along the X-direction, so as to achieve adjustment of the integrated lens set in the X-direction; and correspondingly, when the rotary knob portion of the second adjusting member 1152 is twisted and rotated, the guide rod of the second adjusting member 1152 pushes the integrated lens set to move in the extension direction of the guide rod of the second adjusting member 1152 along the Y-direction, and when the rotary knob portion of the second adjusting member 1152 is twisted and rotated in a reversed direction, under the action of the elastic member 1162, the elastic member 1162 pushes the integrated lens set to move in a direction opposite to the previous movement direction along the Y-direction, so as to achieve adjustment of the integrated lens set in the Y-direction.

In some embodiments, the white-light objective lens set 12 is located at one end of the cam barrel 18 that is adjacent to the visible light incidence direction. One end of the main barrel 11 that is adjacent to the white-light objective lens set 12 is provided with a lens cap 113 that is rotatably connected thereto. When the multi-mode sighting device is set in the infrared aiming mode, the lens cap 113 is closed, and when the multi-mode sighting device is in a state of the entire device being not electrified, the multi-mode sighting device is operable in the white aiming mode, and the lens cap 113 is opened. One end of the main barrel 11 that is adjacent to the white-light objective lens set 12 is provided, on an outside surface thereof, with a pivot seat, and the pivot seat is formed with a pivot hole. The lens cap 113 is rotatably connected to the main barrel 11 by means of a pivot pin extending in the pivot hole of the pivot seat. When the user attempts to operate the multi-mode sighting device in the infrared aiming mode in the daytime, the lens cap 113 can be closed, so as to shut down the white-light aiming assembly 10, allowing the user to quickly switch to the infrared aiming mode. Optionally, one end of the main barrel 11 that is adjacent to the eyepiece set 17 is provided with an eyepiece handwheel 19 that is connected through threading, and the eyepiece handwheel 19 functions for adjusting diopter. A part of the main barrel 11 to which the cam barrel 18 and the eyepiece set 17 are mounted is formed as a first portion and a second portion that are separate from each other, wherein the second portion for mounting the eyepiece set 17 therein is an eyepiece adaptor barrel 119. The eyepiece handwheel 19 is located between the first portion and the second portion, twisting and rotating the eyepiece handwheel 19 drives the eyepiece set 17 to rotate so as to achieve adjustment of diopter. The eyepiece adaptor barrel 119 may limit a movement distance of the main barrel 11 in the axial direction during the course of twisting and rotating the eyepiece handwheel 19.

Figure 9:
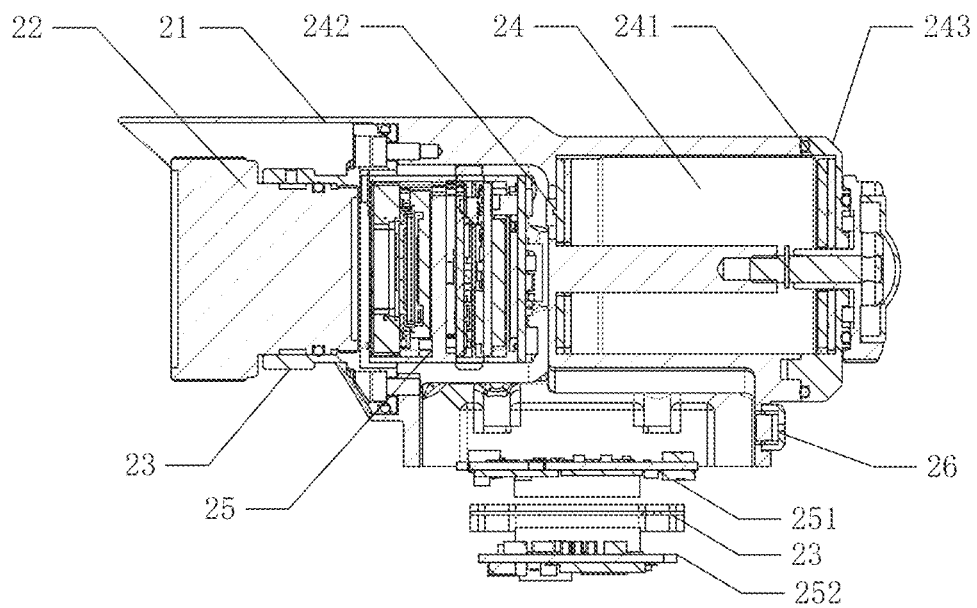
FIG. 9 is a cross-sectional view showing an infrared module according to one embodiment.
Figure 10:
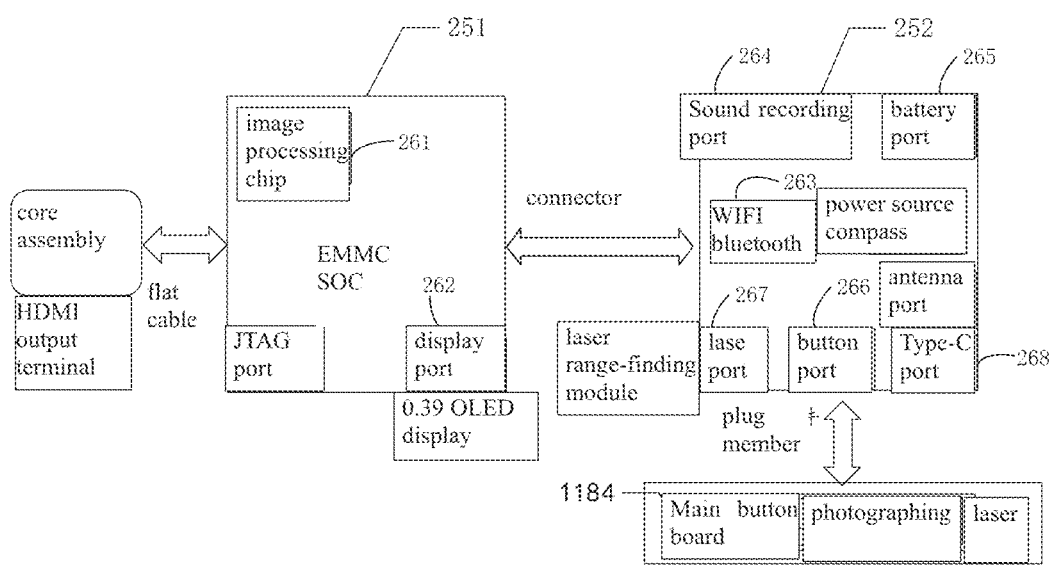
FIG. 10 is a schematic view showing a constituent structure of an infrared module according to one embodiment.

In some embodiments, referring to FIGS. 9 and 10, the infrared module 20 comprises an infrared barrel 21 and a barrel flange 23 received in the infrared barrel 21. The infrared objective lens set 22 is connected, through threading, to one end of the barrel flange 23 that faces incidence of the infrared signal. The infrared core 25 is fixedly connected to one end of the barrel flange 23 that is opposite to the incidence of the infrared signal. In the arrangement that the white-light aiming assembly 10, the infrared module 20, and the laser range-finding module 30 are each set in a modularized arrangement, each module can be mounted independently, so as to reduce the difficulty of assembly for the multi-mode sighting device and improve assembly efficiency. For the infrared module, the infrared objective lens set 22 is first screwed, through threading, onto the barrel flange 23, and the infrared core 25 is fixed to the barrel flange 23 by bolts, and the barrel flange 23 together with the infrared objective lens set 22 and the infrared core 25 is then mounted in the infrared barrel 21. Optionally, the main barrel 11 is provided with a first mounting site 111, and the infrared barrel 21 is provided with a first connecting portion corresponding to the first mounting site 111. A receiving groove is formed along a circumference of the first mounting site 111, and a sealing member 1110 is arranged in the receiving groove. With the first connecting portion aligned with the first mounting site 111, the infrared module 20 can be connected to the main barrel 11 through bolts. The infrared module 20 can be separately assembled and then be mounted to the white-light aiming assembly 10 through collaboration between the first connecting portion of the infrared barrel 21 and the first mounting site 111 of the white-light aiming assembly 10.

Optionally, the infrared barrel 21 is provided, on one end thereof that is distant from the infrared objective lens set 22, with a battery compartment 24. The battery compartment 24 comprises a compartment cover circuit board 241 and a compartment bottom circuit board 242 respectively arranged at two ends. The compartment cover circuit board 241 and the compartment bottom circuit board 242 respectively form, in combination with two sets of battery disposed in the battery compartment 24, a first power supply circuit and a second power supply circuit that are independent of each other. The compartment bottom circuit board 242 and the compartment cover circuit board 241 can be respectively fixed, by means of adhesives, to a bottom of the battery compartment 24 and a battery compartment lid 243, and then, the batteries can be mounted and the battery compartment lid 243 can be twisted and tightened, while a sealing ring can be arranged between the battery compartment lid 243 and the battery compartment 24 for sealing. By arranging the two sets of battery to be respectively in electrical connection with the compartment cover circuit board 241 and the compartment bottom circuit board 242 to form the first power supply circuit and the second power supply circuit that are independent of each other, when one battery set runs short of power, another battery set can be activated to supply power to thereby extent the time of continuous operation of the multi-mode sighting device.

Optionally, the infrared core 25 comprises a main control board 251, and a core assembly and a port board 252 electrically connected with the main control board 251. The main control board 251 is provided with an image processing chip 261 and a display port 262. A display module 40 is connected by a flexible flat cable to the display port 262. The port board 252 is provided with a wireless communication module 263 and a battery port 265, wherein the compartment bottom circuit board 242 and the compartment cover circuit board 241 are individually and electrically connected with the battery port 265, and the batteries, when mounted in the battery compartment 24, are set in electrical connection with the battery port 265 of the port board 252 by means of the compartment bottom circuit board 242 and the compartment cover circuit board 241. The image processing chip 261 may include various image enhancement modes built therein, and the multi-mode sighting device may be provided with enhancement mode buttons for selecting different ones of the image enhancement modes. According to a user's operation on the enhancement mode buttons, the image processing chip 261 may be switched to corresponding ones of the image enhancement modes, and may carry out enhancement processing on an infrared image according to the corresponding ones of the image enhancement modes to be subsequently transmitted to and displayed on the display module 40. For example, the image enhancement modes include thermal image pseudo-color enhancement mode and thermal image contour enhancement mode. The user may select different ones of the image enhancement modes by operating the enhancement mode buttons in order to suit the needs for image enhancement processing for various scenarios to make the target more prominent and realize faster and more accurate capture and aim at the target. The display module 40 can be an organic light-emitting diode (OLED) display, and the OLED display is fixed by means of the adaptor board 184 to the white-light aiming assembly 10, and a flexible flat cable may be extended therefrom to insert into and connect with the display port 262 of the infrared module 20 mounted on the white-light aiming assembly 10. The main control board 251 and the port board 252 can be connected through insertion of connectors. The main control board 251 is a carrier for software function of the entire device and can be connected with the core assembly of the infrared core 25 by means of a flexible flat cable. The port board 252 may include various wireless communication modules 263, such as WIFI and Bluetooth, integrated thereon and may provide a diversified outside-connection port. Various different mechanical buttons may be arranged on an outside surface of the multi-mode sighting device for direct or indirect connection with the outside-connection port of the port board 252 to realize a man-machine interaction function.

Optionally, the port board 252 further comprise a sound recording port 264, and the infrared module 20 further comprise a sound recording module 26 electrically connected with the sound recording port 264. The main control board 251 can be a System-on-Chip (SOC) core board, and a heat dissipating plate 23 can be arranged between the SOC core board and the port board 252. The heat dissipating plate 23 is provided with a connection structure for snap-fit connection with the SOC core board. This arrangement, on the one hand, makes secured connection between the main control board 251 and the port board 252 by means of the heat dissipating plate 23, and on the other hand, the heat dissipating plate 23 can timely dissipate heat generated by the main control board 251 to ensure normal operation of the main control board 251.

Optionally, the port board 252 may be further provided with a button port 266. The main barrel 11 is provided, on one end thereof that is adjacent to the eyepiece set 17, with a button mounting site 118 and a button board 1184 mounted in the button mounting site 118. The button board 1184 comprises a button circuit board 1181, a button cover 1183 arranged in an opening of the button mounting site 118, and a silicone rubber button 1182 located between the button cover 1183 and the button circuit board 1181. The button circuit board 1181 is electrically connected with the button port 266. The button cover 1183 is provided with a mechanical button that correspondingly controls a corresponding button signal generated by the button circuit board 1181, and the button circuit board 1181 generates, according to user's operation of the mechanical button, a corresponding button signal to be transmitted to the main control board 251. The mechanical button may include one button or multiple buttons: an activation button, a menu button, direction buttons, and a photographing button. The button mounting site 118 can be formed at one side of the eyepiece adaptor barrel 119, and the orientation of the button mounting site 118 is perpendicular to the direction of optic lenses of the eyepiece set 17. The button board 1184 is formed of the button circuit board 1181, the silicone rubber button 1182, and the button cover 1183. The silicone rubber button 1182 is configured to provide a restoring elastic force when the mechanical button of the button cover 1183 is pressed, and also to realize a sealing effect. The multi-mode sighting device may realize various setting functions based on the SOC core board, and setting functions may include: (a) activation/deactivation function, (b) sleep wake-up function, (c) operation mode switching function, (d) displaying adjustment function, (e) infrared image electronic magnification varying function, (f) infrared image brightness and contrast adjustment function, (g) infrared image polarity adjustment function, (h) infrared image enhancement function, (i) infrared image correction function, (j) infrared image blind pixel correction function, (k) reticle arranging and adjusting function, (l) self-inspection and malfunction reminder function, (m) electronic compass function, (n) laser distance measurement and distance measurement message displaying function, (o) photographing and video recording function and file management, play-back, and deletion function, (p) open trajectory calculation function, (q) storage card formatting function, (r) Bluetooth connection function, (s) Wi-Fi real time transmission function, (t) power capacity displaying and under voltage indicating function, (u) System time displaying and setting function, (v) sound recording function, (w) external communication function, and (x) factory resetting. The user may operate the button board 1184 to select activation of one or multiple ones of various setting function in order to achieve convenient and rich user's experience.

Optionally, the port board 252 is further provided with a Type-C port 268, and the main barrel 11 is provided, on one side thereof, with a port adaptor barrel 1171, a port adaptor board 1172 received in the port adaptor barrel 1171, and a port board press ring 1173 sealing the port adaptor board 1172 inside the port adaptor barrel 1171. The port adaptor board 1172 is provided with a Type-C female member connectable with the Type-C port 268. The port adaptor barrel 1171 can be arranged on a side surface of the main barrel 11, and in an optional illustrative example, the port adaptor barrel 1171 and the laser range-finding module 30 are arranged at the same side of the main barrel 11. The laser range-finding module 30, after being mounted to the white-light aiming assembly 10, is connected by means of a data line to the Type-C female member on the port adaptor board 1172. Optionally, the core assembly comprises an HDMI output terminal, and the main barrel 11 is provided, on one side thereof, with the port adaptor barrel 1171, the port adaptor board 1172 received in the port adaptor barrel 1171, and the port board press ring 1173 sealing the port adaptor board 1172 inside the port adaptor barrel 1171, wherein the port adaptor board 1172 is provided with an HDMI port for connection with the HDMI output terminal. The HDMI port and the Type-C port 268 can both be arranged on the port adaptor board 1172. The multi-mode sighting device may collect original infrared image data by means of the infrared core 25 for transmission to the main control board 251, providing an outside-connecting HDMI high-definition output port and internal storage. Optionally, the port board 252 is further provided with a laser port 267, and a casing of the laser range-finding module 30 is provided with a laser button electrically connected with the laser port 267. The user may operate the laser button to activate the distance measurement function of the laser range-finding module 30.

In some embodiments, the main barrel 11 is provided with a second mounting site 112. The second mounting site 112 is provided with a first engaging member, and a casing of the laser range-finding module 30 is provided with a second engaging member engageable with the first engaging member. The laser range-finding module 30 and the white-light aiming assembly 10 are detachably snap-fitting connected by means of the second engaging member and the first engaging g member. The white-light aiming assembly 10, the infrared module 20, and the laser range-finding module 30 each possess a modularized arrangement, allowing each module to be mounted independently so as to reduce the difficulty of assembly for the multi-mode sighting device and improve assembly efficiency. The first engaging member and the second engaging member can be arranged as accessories of standard structure, and in an optional illustrative example, the first engaging member is a Picatinny rail, while the second engaging member comprises a projection matching the Picatinny rail. The laser range-finding module 30 can be separately assembled and then mounted on the Picatinny rail on the outside of the main barrel 11 to thereby be mounted to the white-light aiming assembly 10. Optionally, the laser range-finding module 30 is further used for acquiring shot table message, and for real-time updating of the position of an aiming point according to the shot table message and currently-measured distance message, and for transmitting to the display module 40 for displaying. The shot table message includes a firing range mapping relationship for various ammunition in various environments. The laser range-finding module 30 generates a distance message associated with the distance with respect to a search target, which is used in combination with environmental message of the current preset type, such as wind force, rainy day or not, to carry out updating of the position of the aiming point according to the distance message, the environmental message, and the firing range mapping relationship.

It is noted that connections of the infrared module 20 and the laser range-finding module 30 with the white-light aiming assembly 10 are not limited to what described in the previous embodiments, and for example, the infrared module 20 and the main barrel 11 can be connected in a detachable manner, and the laser range-finding module 30 and the main barrel 11 can be fixedly connected. In an illustrative example, the connection structure arranged between the main barrel 11 and the infrared barrel 21 and the connection structure between the main barrel 11 and the casing of the laser range-finding module 30 can be switched with each other.

Optionally, the main barrel 11 is further provided with a support frame 60 for mounting the multi-mode sighting device to a designated product, and for example in use, the multi-mode sighting device can be attached, by means of the support frame 60, to a hunting rifle to assist the user for aiming and shooting.

The multi-mode sighting device provided in the embodiment of the application has at least the following advantages:

Firstly, the white-light aiming assembly 10, the infrared module 20, and the laser range-finding module 30 are each formed as a unity that has relatively complete and independent functionality and are separate from each other, easing assembly, and enabling individual improvement and upgrading for some functionality as desired.

Figure 11:
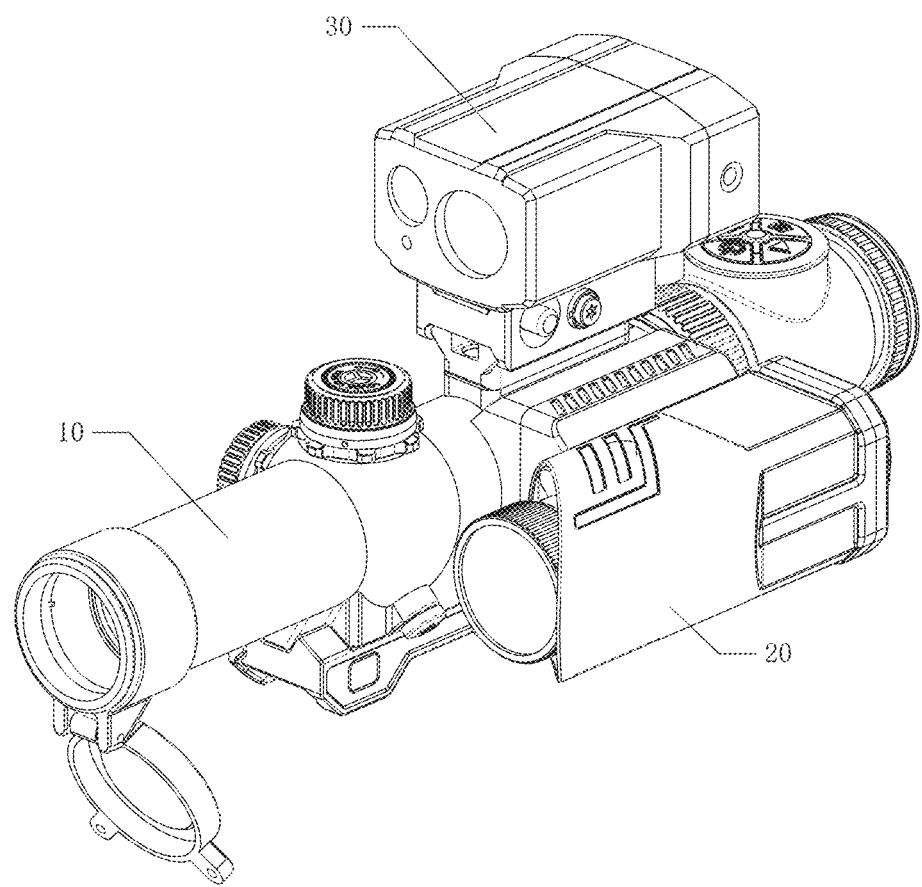
FIG. 11 is a perspective view showing a multi-mode sighting device according to another embodiment.
Figure 12:
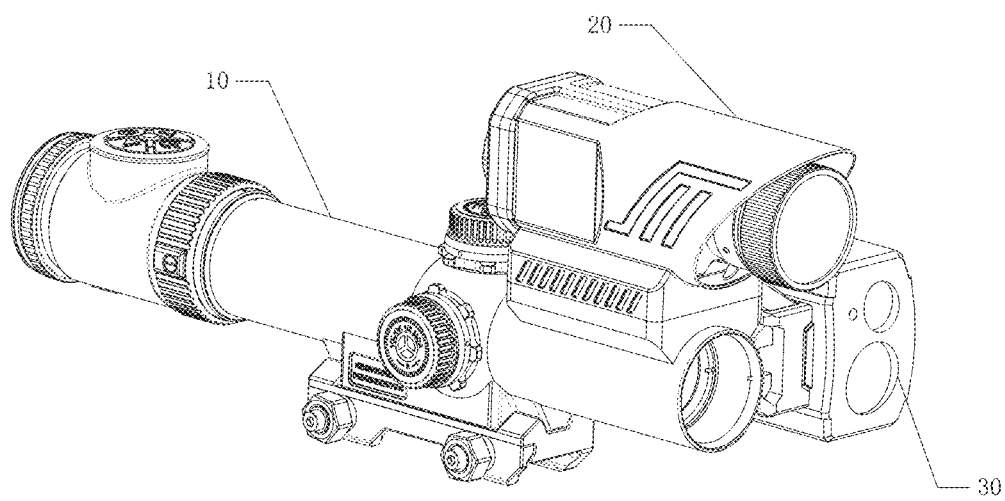
FIG. 12 is a perspective view showing a multi-mode sighting device according to a further embodiment.

Secondly, with an integrated arrangement, combination of the infrared module 20 with the laser range-finding module 30 and the white-light aiming assembly 10 can be made in a more flexible way. As shown in FIG. 11, the locations where the infrared module 20 and the laser range-finding module 30 are mounted on the white-light aiming assembly 10 can be exchanged with each other, and as shown in FIG. 12, the direction in which the infrared module 20 is mounted on the white-light aiming assembly 10 can be reversed. The multi-mode sighting device provides multiple operation modes to allow the user to make selection among the various operation modes according to different requirements for suiting the need for whole-day use and overcoming the deficiency of functionality insufficiency of a single-type sight. Even in case of running out of electrical power, the functions of the infrared module 20 and the laser range-finding module 30 are limited, but this does not affect the functionality of the white-light aiming assembly 10, and thus the white aiming mode can be independently used, allowing the so-integrated multi-mode sighting device to keep the entire functionality of the white-light sight at any time.

Thirdly, in the multi-mode sighting device, by means of the white-light objective lens set 12, the reticle plate 13, the beam combination lens 14, the field lens, the relay lens assembly 16, and the eyepiece set 17 sequentially arranged along the visible-light optical axis and the arrangement of relative positions of the beam combination lens 14 and the display module 40, the infrared optical path 2-1 and the laser optical path 2-2 are additionally included in the multi-mode sighting device as being independent of the white-light optical path 2-3, and the infrared optical path 2-1 and the laser optical path 2-2 can be combined, in preset operation modes, with the white-light optical path 2-3 to realize the multiple beam combination mode, or can be alternatively combined with the white-light optical path 2-3 in a preset operation mode to realize laser white aiming or white-light/infrared combination mode, the combination being flexible and the performance being stable and reliable.

Fourthly, in the multi-mode sighting device, the reticle plate 13 is arranged between the white-light objective lens set 12 and the beam combination lens 14, and in other operation modes where the function of the white-light aiming assembly 10 is not activated, it is possible to prevent observation of a target from being influenced by mechanical reticle appearing in the current field of view.

Fifthly, the relay lens assembly 16 adopts a magnification variation lens set 161, and the reticle plate 13, the beam combination lens 14, the relay lens assembly 16, and the display module 40 are interconnected together to form an integrated lens set for being movable together. During a course of reticle adjustment, the reticle plate 13, the beam combination lens 14, and the relay lens assembly 16 carry the display module 40 to carry out adjustment as a whole, and thus, while supporting adjustment of magnification rate, avoiding the problem that the mechanical reticle deviating from the center of the field of view or changing the position of the image plane causes image being unclear or being impossible to observe a complete displayed area, and keeping the reticle in the central region of the current field of view.

Sixthly, through the arrangement of adding reticle adjustment, on the basis of entire-device adjustment with the reticle plate 13, the beam combination lens 14, the relay lens assembly 16, and the display module 40 being formed as an integrated lens set, by means of controlling positional amounts of the image display region in the horizontal and/or vertical direction with image pixel being taken as unit, the position of the image display region of the display module 40 can be adjusted to eliminate positional difference between an infrared image and a white-light background image.

Figure 13:
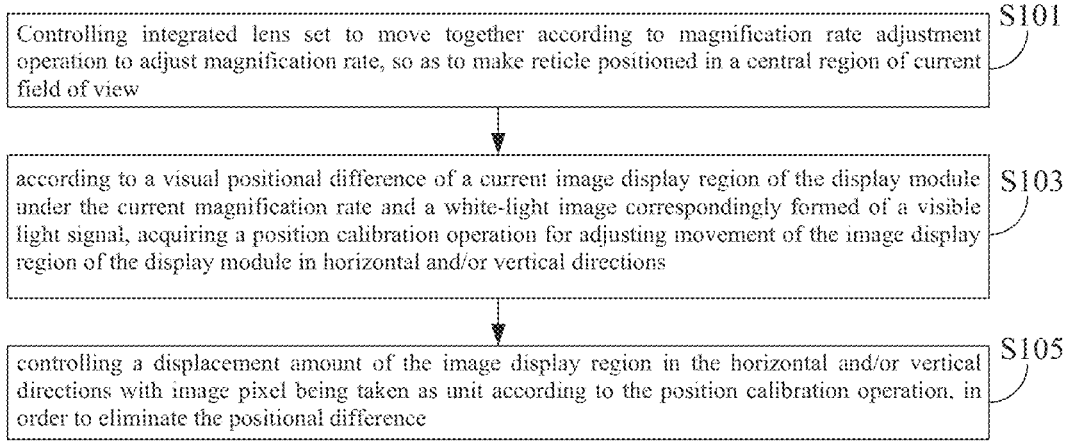
FIG. 13 is a flow chart showing a reticle adjusting method according to one embodiment.
Figure 14:
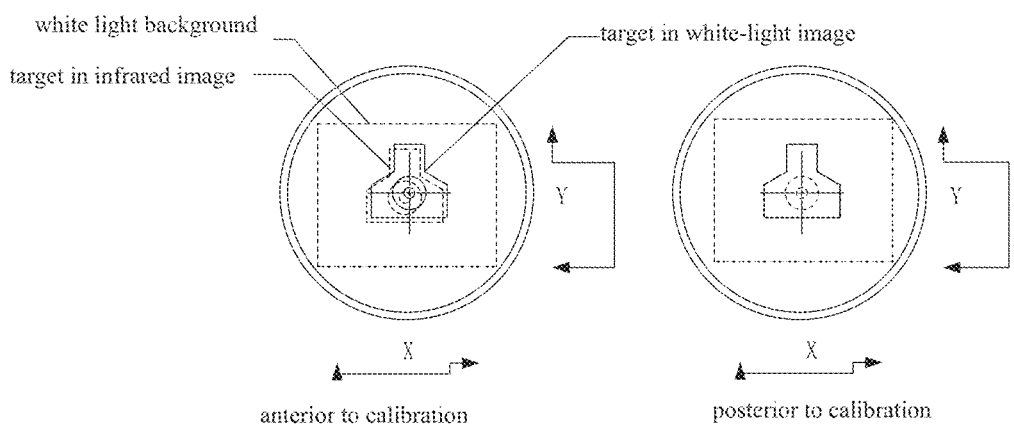
FIG. 14 is a diagram of comparison showing positions anterior to and posterior to position calibration in the reticle adjusting method according to one embodiment.

Referring to FIGS. 13 and 14, in another aspect, the embodiment of the application further provides a reticle adjusting method applicable to a multi-mode sighting device including the reticle adjusting structure according to the embodiment of the application. The method comprises the following steps:

S101, controlling an integrated lens set to move together according to a magnification rate adjustment operation to adjust a magnification rate, so as to make the reticle positioned in a central region of a current field of view;

S103, according to a visual positional difference of a current image display region of a display module under the current magnification rate and a white-light image correspondingly formed of a visible light signal, acquiring a position calibration operation for adjusting movement of the image display region of the display module in horizontal and/or vertical directions; wherein optionally, the positional difference of the current image display region of the display module and the white-light image specifically refers to a visual positional difference of the current image display region of the display module and a second formed image on an image plane of an eyepiece set of a white-light aiming assembly; and S105, controlling a displacement amount of the image display region in the horizontal and/or vertical directions with image pixel being taken as unit according to the position calibration operation, in order to eliminate the positional difference.

The multi-mode sighting device may be further provided with a position calibration operation button for calibration of the position of the infrared image. The position calibration operation button functions for adjusting movement of the image display region of the display module 40 in the horizontal or vertical direction. During selection configuration of OLED, a predetermined range of displacement amount, with image pixel being taken as unit, is set to realize horizontal or vertical direction movement of the OLED display region for calibration of optical axis difference. Optionally, the multi-mode sighting device may further be provided with an image height calibration operation button for calibration of an image height of the infrared image, and the image height calibration operation button functions for adjustment of an image display ratio in the display module 40, and during selection configuration of OLED, a predetermined range of scaling amount, with image pixel being taken as unit, is set to realize expansion and contraction of the OLED display region about a center defined by the display center, so as to have the image height of the infrared image completely matching an image height of a visible light image.

The above provides only specific embodiments of the present invention, but the scope of protection for the present invention is not limited thereto. All the variations and substitutes that skill artisans who are familiar with this technical field may envisage based on the technical scope disclosed in the present invention should be covered in the scope of protection of the present invention. The scope of protection of the present invention is determined only by the appended claims.

The invention claimed is:

1. A reticle adjusting structure, comprising a reticle plate, a beam combination lens, and a relay lens assembly arranged in sequence along a visible-light optical axis and a display module arranged outside of the visible-light optical axis;
   wherein the beam combination lens comprises a first light entry surface and a second light entry surface that are opposite to each other and respectively face a visible light signal incidence direction and the display module;
   wherein the relay lens assembly comprises a magnification variation lens set and a compensation lens set;
   a visible light signal of a target field of view passes through the reticle plate to get incident on the first light entry surface of the beam combination lens, and is then transmitted to the relay lens assembly; a message displayed on the display module transmits, in the form of an optical signal, onto the second light entry surface of the beam combination lens, and is then reflected to the relay lens assembly; and
   the reticle plate, the beam combination lens, the relay lens assembly, and the display module are interconnected together to form an integrated lens set that is collectively movable together, in order to realize collective adjustment during a reticle adjusting course.

2. The reticle adjusting structure according to claim 1, further comprising a main barrel and a cam barrel received in an interior of the main barrel, wherein the reticle plate, the beam combination lens, and the relay lens assembly are mounted inside of the cam barrel, and the display module is fixed on an outside of the cam barrel; the cam barrel is capable of driving the reticle plate, the beam combination lens, the relay lens assembly, and the display module to move together to thereby realize the collective adjustment.

3. The reticle adjusting structure according to claim 2, further comprising a field lens arranged between the relay lens assembly and the beam combination lens for contracting a diameter of a beam transmitting from the beam combination lens to the relay lens assembly.

4. The reticle adjusting structure according to claim 3, wherein the cam barrel comprises a first barrel body and a second barrel body, wherein the beam combination lens is fixed, by means of dispensing adhesive, in an internal of the first barrel body, and the reticle plate and the field lens are respectively fixed, by means of press rings, in the interior of the first barrel body, and a lubrication substance is spread between the relay lens assembly and an inside surface of the first barrel body, and the second barrel body is circumferentially arranged around one end of the first barrel body in which the relay lens assembly is arranged.

5. The reticle adjusting structure according to claim 4, wherein an outside surface of the second barrel body is formed with a positioning groove and a cam portion protruding outside of the main barrel, wherein the relay lens assembly is formed with a threaded hole, and a fastening member sequentially penetrates through the positioning groove and the threaded hole to mount to the relay lens assembly; and wherein when the second barrel body is rotated by operating the cam portion, the relay lens assembly, under an action of the fastening member, is caused to move in the interior of the first barrel body in a direction of the visible-light optical axis.

6. The reticle adjusting structure according to claim 5, wherein the threaded hole comprises a first threaded hole and a second threaded hole that are respectively formed in outer circumferential surfaces of the magnification variation lens set and the compensation lens set, and the positioning groove comprises a first positioning groove and a second positioning groove respectively aligned with the first threaded hole and the second threaded hole.

7. The reticle adjusting structure according to claim 2, wherein the main barrel is provided with a reticle adjusting assembly, wherein the reticle adjusting assembly comprises a first adjusting member for adjusting movement of the cam barrel in the interior of the main barrel in a first direction, a second adjusting member for adjusting movement of the cam barrel in the interior of the main barrel in a second direction, and a pre-tightening assembly for holding the cam barrel at a designated position, so as to realize collective movement of the integrated lens set.

8. The reticle adjusting structure according to claim 7, wherein a spherical structure is provided on an end of the cam barrel, wherein an outside diameter of the spherical structure matches an inside diameter of the main barrel, and the spherical structure functions to limit the integrated lens set to rotation about a center defined by a sphere during adjustment by means of the first adjusting member and the second adjusting member.

9. The reticle adjusting structure according to claim 7, wherein the first adjusting member and the second adjusting member exhibit 90 degrees therebetween in a circumferential direction of the main barrel, and during a movement of the integrated lens set as being adjusted by means of either one of the first adjusting member and the second adjusting member, the pre-tightening assembly provides a position-restoring force, which is opposite to a direction of the movement, to the main barrel.

10. A multi-mode sighting device, characterized by comprising a white-light aiming assembly and an infrared module, the white-light aiming assembly comprising the reticle adjusting structure according to claim 1;
   wherein the visible light signal of the target field of view gets incident on the first light entry surface of the beam combination lens and is transmitted to the relay lens assembly to finally form a white-light image; the infrared module collects an infrared image to transmit to the display module for displaying, so that the infrared image transmits, in the form of an optical signal, to get incident on the second light entry surface of the beam combination lens, and is then reflected to the relay lens assembly.

11. A multi-mode sighting device, characterized by comprising a white-light aiming assembly and a laser range-finding module, the white-light aiming assembly comprising the reticle adjusting structure according to claim 1;
   the laser range-finding module is operable to measure, through a laser optical path, a distance of a search target in a target field of view to generate and transmit a distance message associated with the distance to the display module for displaying, so that the distance message transmits, in the form of an optical signal, to get incident on the second light entry surface of the beam combination lens, and is then reflected to the relay lens assembly.

12. A reticle adjusting method, characterized by applying the reticle adjusting structure according to claim 1 and comprising the following steps:
   controlling the integrated lens set to move together according to a magnification rate adjustment operation to adjust a magnification rate, so as to make the reticle positioned in a central region of a current field of view;
   according to a visual positional difference of a current image display region of the display module under the current magnification rate and a white-light image correspondingly formed of a visible light signal, acquiring a position calibration operation for adjusting movement of the image display region of the display module in horizontal and/or vertical directions; and
   controlling a displacement amount of the image display region in the horizontal and/or vertical directions with image pixel being taken as unit according to the position calibration operation, in order to eliminate the positional difference.

13. A multi-mode sighting device, characterized by comprising a white-light aiming assembly, an infrared module, and a laser range-finding module;
   wherein the white-light aiming assembly comprises the reticle adjusting structure according to claim 1
   the infrared module is operable to collect, through an infrared optical path, an infrared image of the search target to transmit to the display module for displaying, so that the infrared image transmits, in the form of an optical signal, to get incident on the second light entry surface of the beam combination lens, and is then reflected to the rear end of the white-light optical path;
   the laser range-finding module is operable to measure, through a laser optical path, a distance of the search target to generate and transmit a distance message associated with the distance to the display module for displaying, so that the distance message transmits, in the form of an optical signal, to get incident on the second light entry surface of the beam combination lens, and is then reflected to the relay lens assembly;
   wherein the multi-mode sighting device comprises at least one operation mode of a white aiming mode, a laser white aiming mode, an infrared aiming mode, a white-light/infrared combination mode, and a multiple beam combination mode; the white aiming mode is realized with only the white-light aiming assembly in operation; the laser white aiming mode is realized with only the white-light aiming assembly and the laser range-finding module in operation; the infrared aiming mode is realized with only the infrared module in operation; the white-light/infrared combination mode is realized only with the white-light aiming assembly and the infrared module in operation; and the multiple beam combination mode is realized with the white-light aiming assembly, the infrared module, and the laser range-finding module in operation together.

14. The multi-mode sighting device according to claim 13, wherein the white-light aiming assembly comprises a main barrel, and a white-light objective lens set, and an eyepiece set are arranged in sequence in an interior of the main barrel along a visible-light optical axis, wherein the beam combination lens is arranged between the white-light objective lens set and the relay lens assembly, and the visible light signal of the target field of view transmits into the white-light objective lens set and is focused by the white-light objective lens set to get incident on the first light entry surface of the beam combination lens, and the visible light signal transmitted through the beam combination lens passes through the relay lens assembly to form the white-light image on the eyepiece set.

15. The multi-mode sighting device according to claim 14, wherein the reticle plate is arranged between the white-light objective lens set and the beam combination lens;
   the reticle plate, the beam combination lens, the relay lens assembly, and the display module are interconnected together to form an integrated lens set that is collectively movable together.

16. The multi-mode sighting device according to claim 15, wherein the white-light aiming assembly comprises a cam barrel received in an interior of the main barrel, wherein the reticle plate, the beam combination lens, and the relay lens assembly are mounted inside of the cam barrel, and the display module is fixed on an outside of the cam barrel; and
   the white-light objective lens set is located at one end of the cam barrel that is adjacent to a visible light incidence direction, and one end of the main barrel that is adjacent to the white-light objective lens set is provided with a lens cap that is rotatably connected thereto, wherein when the multi-mode sighting device is in the infrared aiming mode, the lens cap is closed, and when the multi-mode sighting device is in a state of entirety being not electrified, the multi-mode sighting device is operable in the white aiming mode and the lens cap is opened.

17. The multi-mode sighting device according to claim 14, wherein the infrared module comprises an infrared objective lens set that is configured to collect the infrared signal of the target field of view and an infrared core that is configured to transform the infrared signal into an electrical signal; and
   the display module is configured to receive the electrical signal transmitted from the infrared core and display an infrared image corresponding thereto, and the infrared image displayed by the display module transmits, in the form of an optical signal, to get incident on the second light entry surface of the beam combination lens and is reflected by the beam combination lens to transmit into the eyepiece set.

18. The multi-mode sighting device according to claim 17, wherein the infrared core comprises a main control board, and a core assembly and a port board electrically connected with the main control board, wherein the main control board is provided with an image processing chip and a display port, the display module being connected by a flexible flat cable to the display port, the port board being provided with a wireless communication module and a battery port, and the infrared module further comprises a battery electrically connected with the battery port.

19. The multi-mode sighting device according to claim 18, wherein the port board is further provided with a button port, and the main barrel is provided, on one end thereof that is adjacent to the eyepiece set, with a button mounting site and a button board mounted in the button mounting site, the button board comprising a button circuit board, a button cover arranged in an opening of the button mounting site, and a silicone rubber button located between the button cover and the button circuit board, the button circuit board being electrically connected with the button port, the button cover being provided with a mechanical button that correspondingly controls a corresponding button signal generated by the button circuit board; and the port board is further provided with a Type-C port, and the main barrel is provided, on one side thereof, with a port adaptor barrel, a port adaptor board received in the port adaptor barrel, and a port board press ring sealing the port adaptor board inside the port adaptor barrel, the port adaptor board being electrically connectable with the Type-C port; or the port board is further provided with a laser port and a casing of the laser range-finding module is provided with a laser button electrically connected with the laser port.

20. The multi-mode sighting device according to claim 14, wherein the main barrel is provided with a reticle adjusting assembly, wherein the reticle adjusting assembly comprises a first adjusting member that is configured to adjust movement of the cam barrel in the interior of the main barrel in a first direction, a second adjusting member that is configured to adjust movement of the cam barrel in the interior of the main barrel in a second direction, and a pre-tightening assembly that holds the cam barrel at a designated position.

* * * * *